US007798766B2

(12) United States Patent  (10) Patent No.: US 7,798,766 B2
Sauer                       (45) Date of Patent:     Sep. 21, 2010

(54) VERTICAL AXIS WIND SAIL TURBINE

(75) Inventor: Dieter R. Sauer, P.O. Box 7654, Laguna Niguel, CA (US) 92607

(73) Assignee: Dieter R. Sauer

( * ) Notice: Subject to any disclaimer, the term of this patent is extended or adjusted under 35 U.S.C. 154(b) by 0 days.

(21) Appl. No.: 12/008,656

(22) Filed: Jan. 14, 2008

(65) Prior Publication Data
US 2009/0180884 A1    Jul. 16, 2009

(51) Int. Cl.
F03D 3/06    (2006.01)
(52) U.S. Cl. .................. 415/4.2; 415/4.4; 415/907; 416/197 A
(58) Field of Classification Search .............. 415/3.1, 415/4.2, 4.4, 906, 907; 416/197 A, 197 R, 416/235, 237
See application file for complete search history.

(56) References Cited
U.S. PATENT DOCUMENTS 4,177,014 A * 12/1979 Kephart, Jr. ............ 416/197 A
4,295,783 A * 10/1981 Lebost ..................... 415/4.4
7,008,171 B1 * 3/2006 Whitworth ................ 415/4.2
2005/0025624 A1 * 2/2005 Pierson ................... 416/197 A
2006/0153682 A1 * 7/2006 Vanderhye et al. ...... 416/197 A

* cited by examiner

*Primary Examiner*—Nathaniel Wiehe
(74) *Attorney, Agent, or Firm*—Edward E. Roberts

(57) ABSTRACT

A vertical axis omni-wind turbine having a wind sail centrally mounted to a rotor, the wind sail consisting of two vanes one on each side of the rotor in generally planar arrangement. The vanes are substantially identical with each having a generally concave surface with an opposite or reverse face that is generally convex. As assembled and mounted to the rotor, one vane presents the concave face to the wind while the vane 180 degrees away presents the convex face. The concave face operates to capture the wind to force rotation of the rotor while the convex face offers minimal resistance to rotor rotation. With continued rotation the reverse, or backside, of the convex surface, which is a concave face, is then presented to the wind, thus to provide continued rotation.

12 Claims, 3 Drawing Sheets

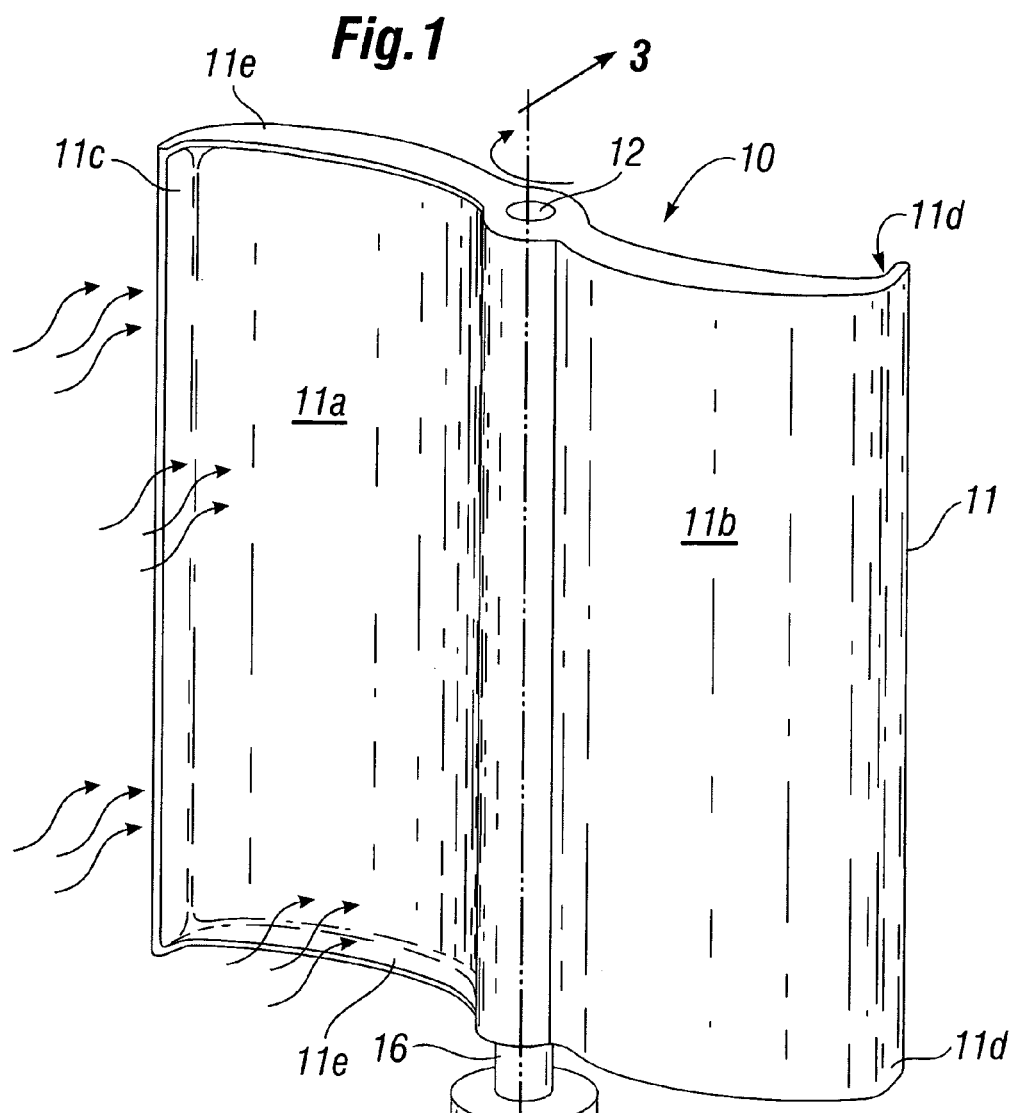
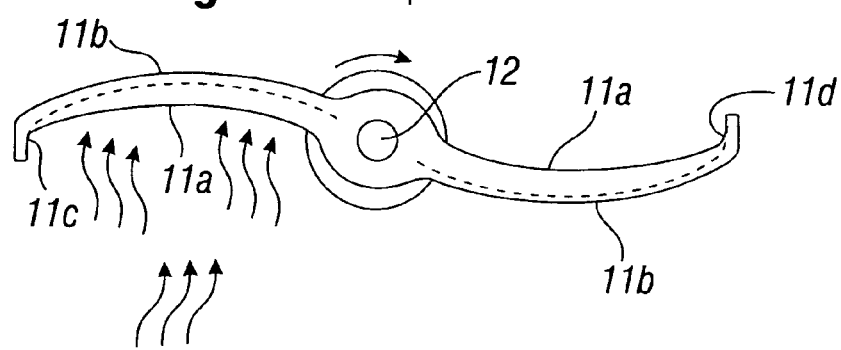

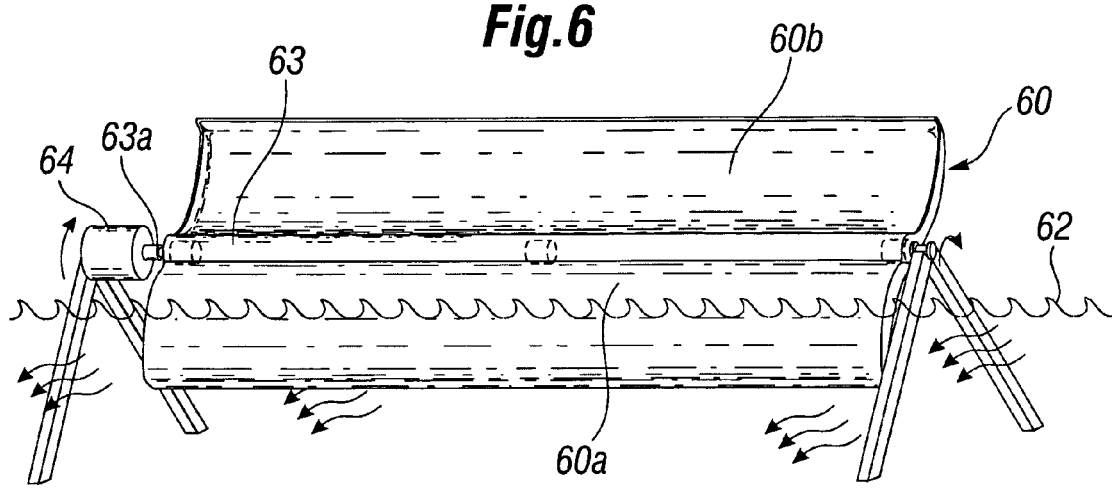
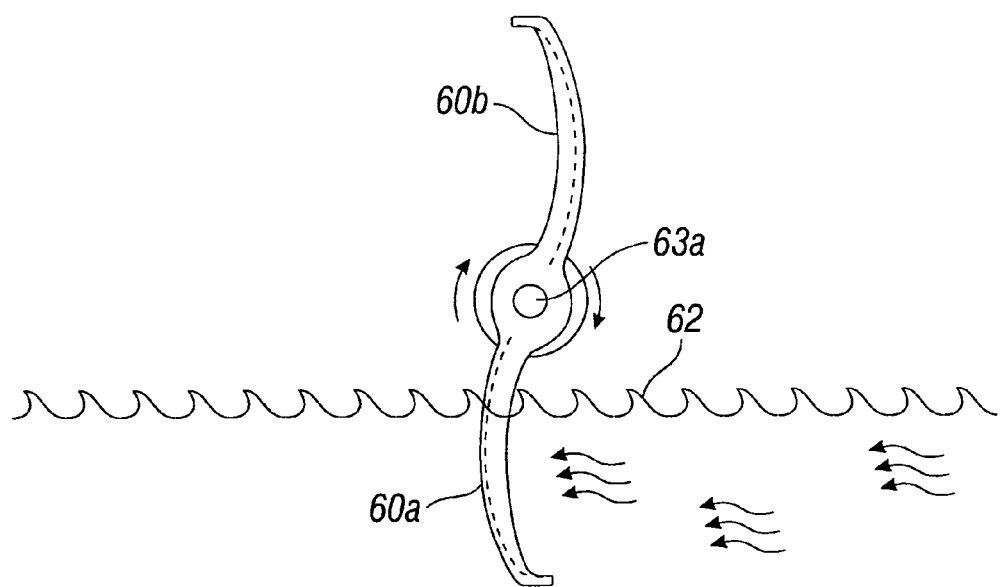

VERTICAL AXIS WIND SAIL TURBINE

BACKGROUND

The background of the invention will be discussed in two parts.

1. Field of the Invention

The present invention relates in general to turbines for converting wind into mechanical energy and more particularly to an omni-wind vertical axis turbine.

2. Prior Art

Apparatus for harnessing the wind to provide mechanical energy have become commonplace and a variety of wind turbines are known in the art. A search of the prior art has not disclosed the wind turbine of the present invention, however, devices of interest are shown and described in the following: U.S. Pat. No. 5,133,637 issued to Wadsworth on 28 Jul. 1992 relates a vertical axis wind turbine having inclined vanes to reduce friction on bearing assemblies affixed to the rotor shaft, U.S. Pat. No. 6,682,842 issued to Boatner on 10 Feb. 2004 relates to a vertical axis wind turbine having multiple stacked wind engines for causing rotation of a rotor about the vertical axis in response to impinging wind, and U.S. Pat. No. 6,308,521 issued to Eylman on 30 Oct. 2001 which relates to a universal power generator utilizing either flow of wind or liquid to generate energy.

Thus, wind-driven apparatus wherein the operative element rotates on a vertical axis are known in the art, however, this type of apparatus generally includes a plurality of arms extending in a horizontal plane wherein a cup-like shaped wind engaging device is secured to the extremity of each arm. The devices are similarly oriented at the extremities of the arms with the result being that of one-half of the apparatus presents a greater resistance to the wind than the other half. These prior art devices are in general too complex, inefficient and uneconomical. Accordingly, considering the shortcomings and deficiencies in the known prior art, it is a primary object of the present invention to provide a new and improved vertical axis omni-wind turbine that more simplistic, efficient and economical in structure than prior art devices. It is another object of the invention to provide a wind sail design suitable for power generation from either wind or water flow. Another object of the invention is to provide a self-starting vertical axis wind turbine which is economical in construction and which has improved mechanical reliability resulting from a reduced load on supporting structures. A further object of the invention is to provide a self starting omni-wind turbine which does not require a wind vane or other device to realign the turbine with each change in the wind direction. Other objects of the invention will become apparent with a reading of the specification taken with the drawings wherein there is shown and described the vertical axis wind sail apparatus of the invention.

SUMMARY

According to the present invention there is provided an omni-wind vertical axis wind turbine which is used to generate electricity or to provide direct power to a mechanical device by means of a power takeoff. The simple and uncomplicated structure provides a self-starting wind turbine which utilizes an omni-wind self starting air foil of efficient and simplistic design with a rotor assembly. The design of the vane permits application for generating energy from either flow of wind or liquid. Center mounted on a vertical rotor, when facing the wind one half of the wind sail on one side of the rotor presents a generally concave configuration to capture impinging wind thrust with the other half on the other side of the rotor 180 degrees away presenting a generally concave configuration to provide minimal resistance. The disparate resistance to the wind causes the wind to react more strongly on one half of the apparatus than the other. The unequal reaction, in turn, causes the apparatus to rotate about its vertical axis. The wind sail halves have identical concave and convex configurations. The apparatus has omni-wind characteristics in that regardless of the wind direction an adequate portion of a concave surface will be exposed to impinging wind. The subsequent rotation of the rotor assembly is transmitted by a rotor assembly to an electrical turbine.

DRAWINGS

FIG. 1 is a perspective elevational view of the vertical axis wind turbine apparatus in accordance with the present invention;

FIG. 2 illustrates in a top view how the configuration of the vane of the turbine apparatus of the invention reacts to impinging wind;

FIG. 6 illustrates an embodiment of the invention wherein it is be used to generate electrical power from liquid wave motion; and FIG. 7 illustrates how the embodiment of FIG. 6 reacts when exposed to impinging liquid.

DESCRIPTION

Figure 3:
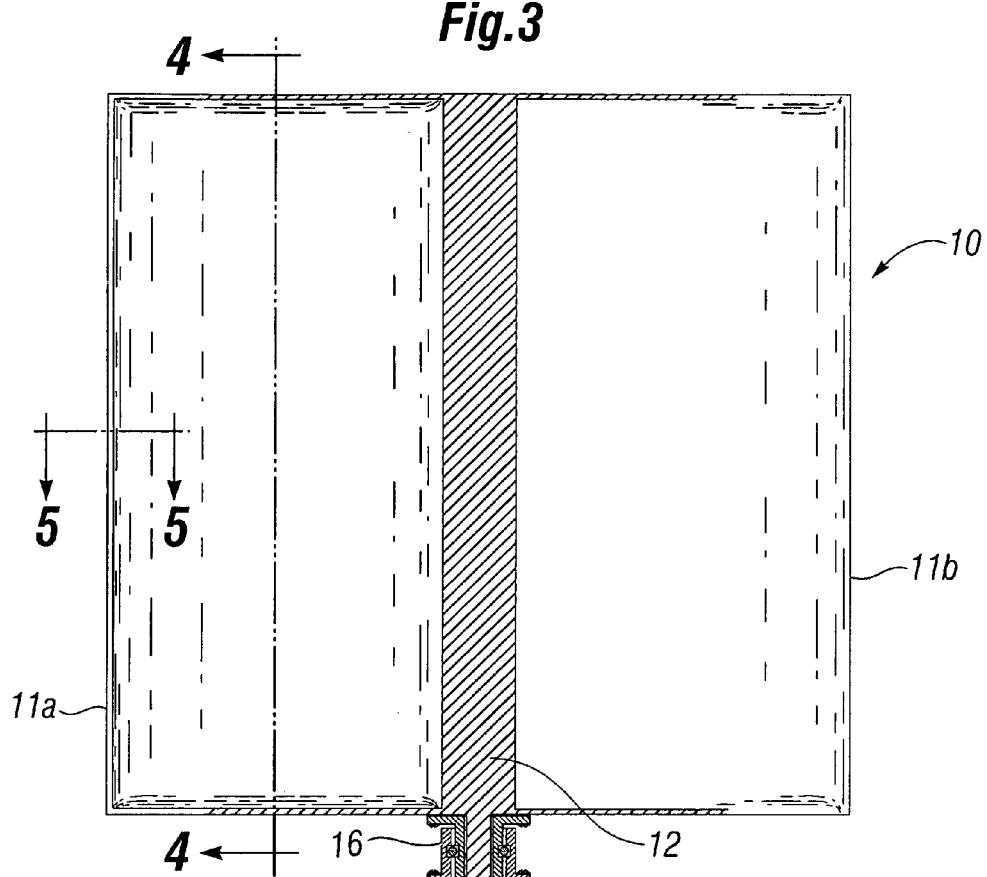
FIG. 3 illustrates a cutaway view of the vane of the turbine apparatus taken along lines 3-3 as shown in FIG. 1.

In the present invention, the wind sail of the invention is formed in a unitary, or one piece configuration, and is centrally mounted to a rotor shaft. The wind sail consists of two joined vanes having an integrally formed centralized channel portion there between for receiving the rotor shaft. The vanes are mounted one on each side of the channel portion in generally planar arrangement, that is, 180 degrees apart. The vanes are substantially identical with each having a smoothly arced generally concave surface with an opposite or reverse smoothly arced face that is generally convex. However, as jointly formed separated only by the centralized channel portion a first vane is oriented to present its concave face with the other vane oriented to present its convex face. Essentially, the other vane is the same as the first vane but rotated 180 degrees vertically. Thus, as mounted to the rotor, shaft one vane presents its concave face to the wind while the vane 180 degrees away is oriented to present its reverse convex face to the wind. In this manner the concave face operates to capture the wind to force rotation of the rotor while the convex face offers minimal resistance to rotor rotation. With continued rotation the reverse, or backside, of the convex surface, which is a concave face, is then presented to the wind, thus providing continued rotation of the rotor shaft.

Referring now to the drawings wherein like reference numerals represent like elements in the several views, there is shown and described the vertical axis omni-wind sail apparatus of the invention. FIG. 1 is a perspective elevational view illustrating the vertical axis wind turbine apparatus, generally designated 10, of the invention. As shown, apparatus 10 includes the unitary, or one-piece, generally vertically elongated wind sail 11, rotor 12, rotor bearing housing 16, and turbine housing 13. One-piece wind sail 11 includes generally identical vane portions 11a and 11b mounted onto rotor shaft 12 in folded over fashion as explained above. That is, vane portion 11a and 11b are joined as one piece by means of an integral central channeled portion for receiving rotor shaft 12, one vane portion on each side of the channeled portion. Thus, vane potions 11a and 11b merge as one piece in generally a straight line manner, that is 180 degrees apart, and at their junction point include a central channel portion for mounting onto rotor 12. Vane portion 11a and 11b each have generally identical smoothly arced concave and a convex faces, and as shown mounted to rotor 12 vane 11a has its concave face presented to the wind whereas vane 11b is inversely mounted to present its convex face to the wind, that is, the same as vane 11b but rotated vertically 180 degrees. Thus, as oriented in operation, the vane portions 11a and 11b of wind sail 11 are configured to simultaneously present a concave face 11a and a convex face 11b to impinging air, that is, wind sail 11 when facing the wind has portion 11a configured to present its concave face to capture impinging wind thrust, as shown by the arrows, with the portion 11b configured to present at the same time its convex face to thus provide minimal resistance to the wind thereby providing an imbalance of pressure about rotor 12 resulting in rotary motion of the sail 11. As illustrated, when wind sail 11 rotates clockwise, as seen in FIG. 2, through 90 degrees vane 11b begins to present its concave face to the wind and vane 11a to present its convex face to the wind, thus to continue rotation of wind sail 11.

The concave vane portions include a ridged side edge as illustrated by edge 11c and protruding top and bottom edges as illustrated by edges 11e that are configured to provide increased concavity and thus additional wind capture means. The combination of simultaneously providing a concave face of a vane, as illustrated by 11b on one side of the rotor 12 and a convex face, as illustrated by 11b on the other side of the rotor operates to provide unequal wind pressure about rotor 12 to provide omni-wind characteristics to the apparatus 10 configuration, that is, regardless of the wind direction an adequate portion of a concave surface will become exposed to impinging wind.

FIG. 2 in top view illustrates the configuration of the wind sail 10 of the invention and the manner in which it reacts to impinging wind. As illustrated, wind impinges and is captured on the concave vane portions 11a of the wind sail 11 while sliding from the convex portions 11b to produce rotation in a clockwise direction as illustrated by the arrow. If The wind sail 10 is inversely mounted to the rotor 12 the impinging wind would rotate the wind sail 10 in the counter-clockwise direction. Since the portions 11a and 11b are essentially identical, but inversely oriented portion 11a has a reverse side identical to portion 11b and vice versa. In other words, with rotation of wind sail 11 though 180 degrees, portion 11a will present to the wind a reverse side identical to 11b, and 11b will present to the wind a reverse side identical to 11a. Thus, each vane has a back side identical to the others front side resulting in one half of wind sails 11 always presenting a significant portion of a concave face to the wind in order to start and maintain rotation of the wind sail 11 and the other half presenting a corresponding convex face. The vanes are thus non-planar, being slightly arced in opposite directions with more curved, or abruptly ridged side ends, such that as the vane rotates the side capturing the wind comes in line with the direction of the wind and then transitions to become the non-resistant half and vice versa. Mounted as shown in FIG. 2 the top view of wind sail 10 shows a reversed S-shaped configuration whereas if inversely mounted to rotate in the counter-clockwise direction the top view would present an S-shaped configuration. Top and bottom edges 11e further contribute to the disparate resistance to the wind causing the wind to react more strongly on one half of the apparatus than the other. The unequal reaction, in turn, causes the apparatus to rotate about its vertical axis. The edges 11c, 11d exacerbate the concavity and convexity to thereby, respectively, more effectively hold and release the wind. The subsequent rotation of the rotor shaft is transmitted by a rotor assembly to an electrical generator. Although only two vane blades, 11a and 11b, are shown, it is understood that more identical blades could be mounted at selected angles from each other, such as for instance, three blades located 120 degrees apart.

FIG. 3 is a cutaway view of the apparatus 10, taken along lines 3-3 as indicated in FIG. 1. Wind sail 11 is indicated as rectangular, although some other suitable configuration may be used in keeping with the invention, and is centrally mounted on the rotor 12, having substantially identical portions 11a and 11b as previously described. Rotor 12 extends through rotor bearing housing 16 and coacts in any suitable manner with turbine 14 of turbine housing 13, the rotor 12 rotated by operation of wind sail 11 to provide rotary motion for powering the turbine 14. Turbine 14 in turn provides electric power to storage means 15 with the electric power accessed at power outlet 15a. It is understood that the rotary power could as well be applied to an electrical motor or any other suitable device.

Figure 4:
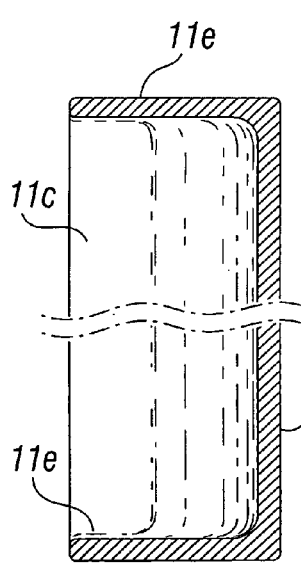
FIG. 4 illustrates a cutaway view of the vane of the turbine apparatus taken along lines 4-4 as shown in FIG. 3.

FIG. 4 illustrates in cutaway view the vane 11a of the invention, taken along lines 4-4 as shown in FIG. 3, in which the relative configurations of ridged edge 11c and top and bottom edges 11e are more clearly shown. In this manner the rotational effect on wind sail 11 by impinging air is maximized.

Figure 5:
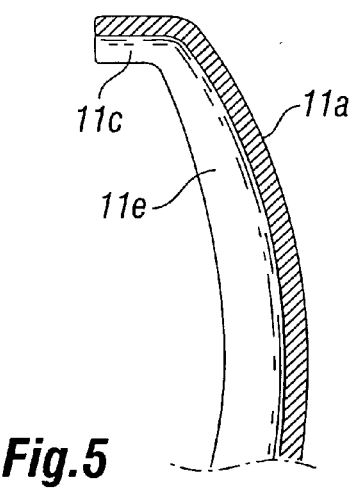
FIG. 5 illustrates a cutaway view of the vane of the turbine apparatus taken along lines 5-5 as shown in FIG. 3.

FIG. 5 illustrates in cutaway view the vane 11a of the invention, taken along lines 5-5 as shown in FIG. 3, in which the relative configurations of vane portion 11a, side edge 11c, and bottom edge 11e are shown. As also seen in FIGS. 2 and 7, the vane portion 11a and 11e clearly show the smoothly arced curved configurations of the concave and convex vane portion of the invention.

FIG. 6 presents another embodiment of the invention illustrating the manner in which electrical power can be generated from continuous flow of a liquid such as water. Essentially the method of operation is very similar to that previously described except that a vane portion of the invention, generally designated 60, is mounted on a horizontal axis 63 having a rotor 63a, with only one portion, or blade, 60a immersed, or partially immersed, in the water 62. As the motion of water 62 impinges blade 60a the resulting turning of the rotor 63a operates to generate power from the turbine 64. The invention is shown supported by a simple arrangement although it is understood that any arrangement compatible with the environment of use could be employed. Further, although only one vane is shown, it is understood that additional vanes could be used mounted on the rotor 63 at selected angles from each other. In fact, if axis 63 is located above the water 62 then a third blade (not shown) identical to blade 60a would likely be required.

FIG. 7 better illustrates in an end view the manner in which a vane of the invention reacts to impinging liquid. This is an instance where the axis 63 is above water and thus a third blade would be used if necessary.

While the principles of the invention have now been made clear in illustrative embodiments, there will be immediately obvious to those skilled in the art many modifications of structure, arrangement, proportions, the elements, materials, and components, used in the practice of the invention which are particularly adapted for specific environments and operating requirements without departing from those principles.

What is claimed is:

1. Apparatus for utilizing the force of the wind to drive a rotatable output shaft, said apparatus comprising:

a one piece longitudinally extending wind sail having first and second generally identical vane members adjoined at a central channeled portion and extending vertically aligned in an inline manner 180 degrees apart from said central channeled portion;

a longitudinally extending rotor shaft;

said central channeled portion of said wind sail configured for receiving said rotor shaft for centrally mounting of said wind sail on said rotor shaft; said first and second vane members are identical and adjoined to said central portion configured with each having an arced concave front face and an arced convex rear face;

said first and second vane members extending from said central portion in inverse relationship such that when said first vane member presents a concave front face on one side of said rotor shaft said second vane member presents a convex face on the other side of said rotor shaft;

each said vane member having a top, bottom and an outer edge terminating in a ridge extending outwardly from said concave face for causing greater wind force concentration against said concave face; and wherein said wind sail has a generally S-shaped cross-wise cross section.

2. The apparatus of claim 1 wherein said concave front face of said first vane member and said rear convex face of said second vane member are simultaneously rotated to consistently present a sufficient concavity to impinging wind to provide omni-wind operation.

3. The apparatus of claim 1 wherein the combination of said first and second vane portions and said central channeled portion are configured to consistently present a sufficient concavity to impinging wind to provide self-starting omni-wind operation.

4. The apparatus of claim 1 wherein said vane members merge in-line as one piece to include said central channeled portion there between.

5. A one-piece wind sail responsive to the force of wind or liquid flow to drive a rotatable shaft, said wind sail comprising:

a one-piece vane member having first and second in line vane portions each portion having an arced front concave face and an arced reverse convex face, each said vane portion adjoined through a centrally located channeled portion such that said first and second vane portions are on opposite sides of said channeled portion;

each said vane portion extending 180 degrees apart in an inline manner and in vertical alignment from said channeled portion;

said first and second vane portions extending from said central portion in inverse relationship such that when said first vane member presents a concave front face on one side of said channeled portion said second vane member presents a convex face on the other side of said channeled portion;

each said vane portion having a top, bottom and an outer edge terminating in a ridge extending outwardly from said concave face for causing greater wind force concentration against said concave face; and wherein said wind sail has a generally S-shaped cross-wise cross section.

6. The wind sail of claim 5 wherein the one piece combination of said first and second vane portions and said channeled portion are configured to consistently present a sufficient concavity to impinging wind to provide self-starting omni-wind operation.

7. Apparatus for driving a rotatable output shaft, said apparatus comprising:

a rotor assembly including a rotor shaft and means for utilizing the rotary power of said rotor shaft;

impeller means responsive to wind or fluid flow for driving said rotor shaft;

said impeller means includes as one-piece a channeled central portion with adjoining first and second vane members extending in-line in vertical alignment 180 degrees apart from said central portion, each said vane member having a front arced concave face and a rear arced convex face, said impeller means centrally mounted on said rotor shaft at said central portion such that the concave front face of said first vane is provided on one side of said rotor with the convex face of said second vane provided on the other side of said rotor, said concave face operating to respond to said wind or fluid flow to force rotation of said rotor shaft while said convex face offers minimal resistance to rotation of said rotor shaft;

each said vane member having a top, bottom and an outer edge terminating in a ridge extending outwardly from said concave face for causing greater wind force concentration against said concave face;

said impeller has a generally S-shaped cross-wise cross section; and wherein with continued rotation of said rotor shaft said convex face sequentially presents its reverse concave face to said wind or fluid flow to provide continued rotation of said rotor shaft.

8. The apparatus of claim 7 wherein said first and second vane members are identical with said second vane member adjoined to said central portion in inverse vertical relationship to said first vane member.

9. The apparatus of claim 8 including a plurality of substantially identical impeller means for sequential mounting along said rotor shaft.

10. Apparatus for utilizing the force of the wind to drive a rotatable output shaft, said apparatus comprising:

rotor assembly means including a rotatable output shaft;

a one-piece longitudinally extending wind sail having a channeled central portion for fixedly receiving said output shaft and first and second vane members adjoining said central portion and extending one on each side from said central portion displaced 180 degrees from each other;

said first and second vane members extending from said central portion in line in vertical alignment and having a generally S-shaped cross-wise cross section;

each said vane member having a top, bottom and an outer edge terminating in a ridge extending outwardly from said concave face for causing greater wind force concentration against said concave face;

said first and second vane portions are generally identically configured with each having an arced generally concave front face and an arced generally convex rear face, said vane portions oriented inversely such that when said concave front face of said first vane is provided on one side of said central portion the convex face of said second vane is provided on the other side of said central portion; and whereby said concave face operates to capture impinging wind to provide rotation of said output shaft while said convex face simultaneously offers minimal resistance to rotation of said output shaft.

11. The apparatus of claim 10 wherein with continued rotation of said output shaft said concave front face of said first vane member and said rear face of said second vane member are simultaneously rotated to consistently present a sufficient concavity to impinging wind to provide omni-wind operation.

12. The apparatus of claim 10 wherein the one piece combination of said first and second vane portions and said central portion are configured to consistently present a sufficient concavity to impinging wind to provide self-starting omni-wind operation.

* * * * *